United States Patent
Newton

[11] 3,997,303
[45] Dec. 14, 1976

[54] LIQUID-GAS PHASE SEPARATOR HAVING A PERFORATED PLATE AND MIST ELIMINATOR PAD

[75] Inventor: Charles L. Newton, Bethlehem, Pa.

[73] Assignee: Air Products and Chemicals, Inc., Allentown, Pa.

[22] Filed: May 1, 1975

[21] Appl. No.: 573,645

[52] U.S. Cl. .................................. 55/97; 55/185; 55/320; 55/410; 55/419; 55/463

[51] Int. Cl.² ........................................ B01D 46/00

[58] Field of Search ............ 55/97, 185, 259, 306, 55/320, 323, 414, 416, 418, 419, 462, 482, 463; 210/247; 138/41

[56] References Cited
UNITED STATES PATENTS

| | | | |
|---|---|---|---|
| 301,223 | 7/1884 | Drummond | 55/463 |
| 1,439,151 | 12/1922 | Dailey et al. | 55/419 |
| 1,739,093 | 12/1929 | Ruby | 55/419 |
| 2,106,589 | 1/1938 | Bigger et al. | 55/185 |
| 2,952,331 | 9/1960 | Beach | 55/323 |
| 3,006,435 | 10/1961 | Alton et al. | 55/463 |
| 3,022,859 | 2/1962 | Sexton | 55/97 |
| 3,066,462 | 12/1962 | Yap et al. | 55/97 |
| 3,085,381 | 4/1963 | Sobeck | 55/323 |
| 3,217,750 | 11/1965 | Thomas | 138/41 |
| 3,720,046 | 3/1973 | Kudirka et al. | 55/418 |

Primary Examiner—Bernard Nozick
Attorney, Agent, or Firm—Russell L. Brewer; Barry Moyerman

[57] ABSTRACT

This invention relates to a tubular phase separator for removing entrained liquid from a gas stream having a feed inlet, a gas outlet spaced apart from the feed inlet, a liquid outlet spaced apart and below the feed inlet and gas outlet, and a mist eliminator pad disposed between the feed inlet and the gas outlet. The improved phase separator has a plate disposed between the mist eliminator pad and the gas outlet having a plurality of perforations therein for effecting improved gas flow across the mist eliminator pad and for improving the efficiency in removal of entrained liquid.

3 Claims, 2 Drawing Figures

LIQUID-GAS PHASE SEPARATOR HAVING A PERFORATED PLATE AND MIST ELIMINATOR PAD

BACKGROUND OF THE INVENTION

It is often desired to remove water or heavy organic droplets from a natural gas stream, from synthesis gas for ammonia, etc., or the removal of water and organics from an inert gas in a gas liquefaction plant in order to avoid contamination of equipment and pipelines. In some instances, a small amount of entrained liquid can be tolerated and in others these gases need to be "dry". A variety of apparatus and methods have been developed to accomplish this result.

Gravitational phase separators have long been used to remove liquid droplets from a gas stream and they simply rely on gravity and reduced gas velocity to accomplish the separation. In a gravitational phase separator, typically a column, the velocity of the gas as it is passed through the unit is reduced to permit the droplets to coalesce and settle out by the action of gravity. The liquid then is drained from the bottom of the phase separator and the gas is discharged from the top.

DESCRIPTION OF THE PRIOR ART

In gravitational phase separators, it has been proposed to direct the inlet gas stream into the side of the column and downward over a liquid slash cone supported in the tubular phase separator in order to deflect and diffuse the inlet gas stream to achieve uniform flow rate in the column. Additionally, the liquid splash cone serves as a medium whereby the droplets can coalesce and drip off the cone into the liquid below.

It has been proposed to employ curtains, rods, guide vanes, baffle plates and screens in a gravitational phase separator to minimize eddy currents and reduce turbulence as the gas flows from the inlet to the outlet. Vertical baffle plates and horizontal plates arranged as shelves within the phase separator have been used to enhance collection. However, it has been observed that the horizontal plates have been more effective in removing entrained liquids or particles from the gas stream than the vertical baffle plates.

It has also been known to employ a mist eliminator pad, which generally is a woven or knotted mat of wire, to provide a surface on which entrained liquid droplets can coalesce and form larger droplets which then can drip from the mist eliminator pad and settle back into the liquid layer below. The mist eliminator pad is mounted between the feed inlet and gas outlet, and is of substantially the same cross-section as the container itself so that substantially all of the gas stream flowing from the inlet to the outlet passes through the mist eliminator pad. In this way, entrained liquids can be removed more efficiently.

SUMMARY OF THE INVENTION

It has been found that the efficiency of a tubular phase separator having a feed inlet, a gas outlet spaced apart from the inlet, a liquid outlet below said feed inlet and said gas outlet, and a mist eliminator pad disposed between said inlet and said gas outlet can be enhanced by including a plate between the mist eliminator pad and the gas outlet, the plate having a plurality of perforations therein. Preferably the perforations are substantially uniform in size and uniformly disposed in the perforated plate to provide substantially equal flow rates through each perforation.

The invention also relates to an improved process for removing entrained liquid from a gas wherein a gas stream is passed through a container having an inlet, a gas outlet, a liquid outlet below the inlet and the gas outlet and a mist eliminator pad disposed between said feed inlet and said gas outlet, the improvement for distributing flow across the mist eliminator pad and improving the efficiency of the mist eliminator pad which comprises dividing the gas stream as it passes from said inlet to said outlet into a plurality of streams which are substantially uniform and substantially equally disposed from each other at a point between the mist eliminator pad and the gas outlet.

Advantages of the apparatus and process are several and include:

an ability to reduce turbulence and eddy currents in the gas stream as it is passed from the inlet through the mist eliminator pad and to the outlet thereby permitting greater uniformity of gas velocity in the phase separator and permitting enhanced separation of entrained liquid; and an ability to more effectively use the complete surface of the mist eliminator to permit coalescence of entrained liquid and removal from the gas stream.

THE DRAWINGS

DESCRIPTION OF THE PREFERRED EMBODIMENTS

Figure 1:
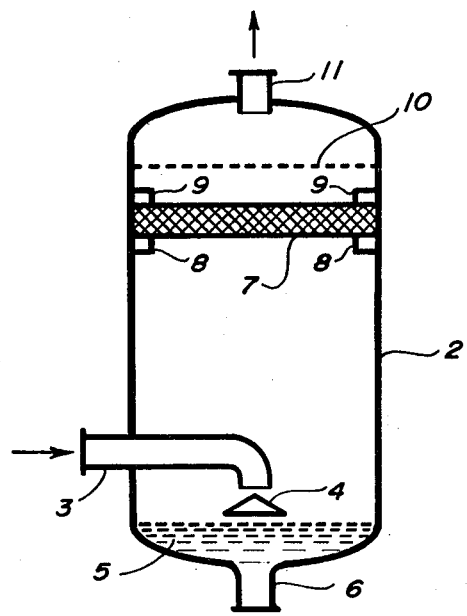
FIG. 1 is a view in elevation of a column type tubular phase separator employing a mist eliminator pad and perforated plate.

Referring to FIG. 1, there is shown a vertical tubular liquid-gas phase separator 2. A gas stream containing entrained liquid droplets is introduced into phase separator 2 through feed inlet 3. The inlet gas is directed downwardly in the column and over liquid splash cone 4. Some of the liquid condenses on the splash cone and drops off into the liquid layer 5 below, for discharge through liquid outlet 6. The incoming gas is diffused somewhat by the expansion from the feed inlet 3 into the phase separator 2 and by the diffusing action of the liquid splash cone 5 and reduced in velocity. The gas flows upwardly and through a mist eliminator pad 7. The mist eliminator pad is supported on supports 8 and 9. The gas then flows through perforated plate 10 and out gas outlet 11.

Figure 2:
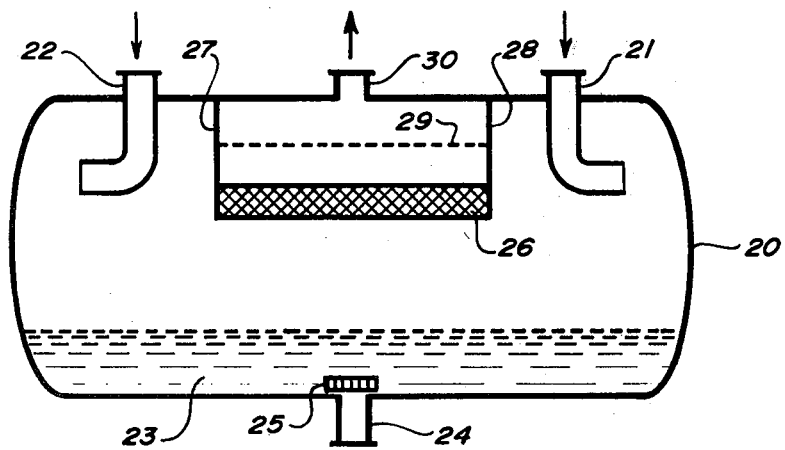
FIG. 2 is a view in elevation of a flash drum type tubular separator employing a mist eliminator pad and perforated plate.

FIG. 2 shows a splash drum separator 20 having feed inlet ports 21 and 22. The gas, which is flowing downward, is directed horizontally and against the ends of the drum in order to enhance diffusion of the gas throughout the drum. Some of the liquid droplets in the gas fall to the bottom of phase separator 20 forming liquid layer 23. The liquid is discharged through liquid outlet 24 and recovered or sewered. A vortex breaker 25 is positioned above the liquid outlet 24 for breaking any vortex that might form during the discharge of liquid layer 23 from liquid outlet 24.

The velocity of the gas in the flash drum as in the column separator is reduced substantially to permit the liquid droplets to settle by gravitational means in the tank. The gas is forced through mist eliminator pad 26 which serves to enhance coalescence of the liquid entrained in the gas stream. The coalesced liquid droplets fall from the mist eliminator into the bottom of the separator 20 with the other liquid 23. The gas, after passing through the mist eliminator pad, flows through perforated plate 29 and then is discharged through gas outlet 30. Both mist eliminator pad 26 and perforated plate 29 are supported by supports 27 and 28. The supports are such that the gas must flow through the mist eliminator pad and the perforated plate and cannot bypass either.

As is manifest from FIGS. 1 and 2, the feed inlet is spaced apart from the gas outlet, which generally is at the top of the phase separator, so that the flow of gas is countercurrent to the flow of liquid droplets. The liquid outlet in the phase separator naturally is located near the bottom of the separator and below the feed inlet and gas outlet so that the liquid can be drained therefrom.

The mist eliminator pads are located between the inlet and gas outlet of the phase separator so that the gas can pass through the pad and effect coalescence of the smaller drops of entrained liquid and form larger droplets. These droplets can fall from the mist eliminator pad into the bottom of the phase separator for discharge. Mist eliminator pads generally are knitted beds of woven wire, e.g., wire mesh screens, fiberglass, and the like which provide a large surface area on which the droplets can impinge and coalesce. The gas proceeds to the outlet unimpaired by the pad. Materials suited for forming mist eliminator pads are well known and such pads can be used in practicing this invention.

As stated before, it was found quite unexpectedly, that improved efficiency in removal of entrained liquid from a gas stream could be effected in a tubular phase separator employing a mist eliminator pad if a perforated plate were placed between the mist eliminator pad and the gas outlet. Apparently the perforated plate provides a substantial pressure drop across the plate to effect greater equalization of gas flow at a point between the inlet and the perforated plate. Thus, in actuality greater uniformity of gas flow is observed through the mist eliminator pad than otherwise would be noted. With greater distribution of the gas flow, the approach velocity of the gas approaching the pad is below the flooding velocity of the pad and more nearly approaches design velocity to permit settling of liquid droplets entrained in the gas stream. When the gas flow rate through the mist eliminator pad is nonuniform, the gas velocity through the pad inherently is faster at some points than others, and causes these smaller droplets of liquid, which otherwise might settle at a lower gas velocity, to be carried overhead from the phase separator.

The perforated plate is located between the mist eliminator pad and gas outlet rather than between the inlet and demister pad. In the past perforated plates have been used to enhance uniformity of gas flow through catalyst bed reactors, desiccant bed driers and absorbed bed units. However, the perforated plate is located between the inlet of these respective apparatus and the bed itself and the uniformity of flow is established on the leeward side of the perforated plate. This approach cannot be used in phase separators as the gas flowing through each perforation has a greater velocity than the gas velocity in the phase separator itself. The increased gas velocity through each perforation tends to prevent entrained liquid droplets from settling which otherwise might settle at a lower gas velocity and carries them into the mist eliminator pad and out the gas outlet.

The perforated plate should have a plurality of perforations therein which are substantially uniform in size (within plus or minus 20% area of each other and preferably plus or minus 5% area). Further, they should be substantially equally spaced from each other and uniformly about the plate so that substantially equal amounts of gas will fow through each perforation. In other words, the flow rate through each perforation should be substantially the same, e.g., within 20% of each other. Secondly, the larger the resistence across the perforation compared to the resistence of the gas to rearrangement, the more closely will uniform flow distribution be approached through the mist eliminator pad. To insure that rearrangement of the gas will take place, and thereby enhance greater uniformity of velocity in the phase separator between the inlet and the perforated plate and thereby across the mist eliminator pad, the combined cross-sectional area of the perforations in the plate should be from about 0.3–30% and preferably from about 0.6 to 10% of the total cross-sectional area of the gas flow region in the phase separator. In other words, the combined cross-sectional area of each of the columns of gas as it passes through the perforated plate should be from about 0.3–30% or preferably from 0.6 to 10% of the combined cross-sectional area of the gas stream approaching the perforated plate. The perforations in the plate should be substantially uniform and equally distributed so that equal incremental flows will be obtained. Experience has shown that each perforation should have a cross-sectional area of from about 0.00001 to 0.7% and preferably from 0.0008 to 0.35% based on the cross-sectional area of the phase separator. These percentage ranges translate to hole sizes of from 1/16 to 6 inches for columns having a column diameter of from about 1–30 inches. Generally hole sizes of from ⅛–¾ inch are employed in such columns.

In designing a gravitational separator employing a mist eliminator pad and perforated plate, it is easier to equate the cross-sectional area of the perforations vis' a vis' the cross-sectional area of the column in terms of pressure drop across the plate versus the pressure drop from inlet to the outlet of the column. This is particularly for economic justification. Based on fluid dynamics, the greater the pressure drop across the plate, the more uniform the flow rate of gas through the column. However, costs increase with an increase in pressure drop and therefore there is some justification for reducing the pressure drop. On the other hand, reduced pressure drop across the plate results in less uniform velocities of the gas flowing through the column and leads to larger diameter columns. Generally, the pressure drop in gravitational separators of the type contemplated from inlet to outlet is from 0.2–15 psi and usually from 0.35–3 psi. A pressure drop across the perforated plate of from about 55–75% of the total pressure drop from inlet to outlet generally gives desired results i.e., adequate rearrangement of the gas in the column for substantially uniform flow and optimum economics in terms of column cost verses power costs.

Once determining the desired pressure drop across the perforated plate it is possible to determine the cross-sectional area and therefore the column diameter by first calculating the velocity of gas in the column from the formula $$V = K_V \sqrt{(D_L - D_G)/D_G}$$

wherein V is the velocity in feet per second, $K_V$ is a constant, usually from 0.2–0.5 and generally 0.3–0.35 derived from experimental results for obtaining droplet separation, $D_L$ is the density of the liquid and $D_G$ is the density of the gas in lbs/ft$^3$ and then dividing the estimated throughput per second of gas in ft$^3$ by the velocity of the gas. Once the cross-sectional area of the column, the column diameter is known, and therefore the diameter of the perforated plate is known.

With this information it is possible to determine or lay out the quantity and size of perforations necessary to give this required pressure drop and to lay the perforations out so that they are equal in size and uniformly equidistant from each other. Generally, the quantity and size of the holes is a function of the height of the perforated plate above the mist eliminator pad. The distance (x) between the centers of the holes divided by the height (y) of the perforated plate above the mist eliminator pad for good gas distribution and rearrangement should not exceed the tangent of about 30° and preferably 20°. With fewer holes in the perforated plate, the distance (y) must increase so that the tangent does not exceed a 20° angle. Of course the cost of the column increases substantially as the height of the plate above the pad increases. Therefore, in economic terms, it is better to place more holes in the perforated plate and locate it closer to the pad.

The perforations in the plate can be circular, square, octagonal, rectangular, circular slits, and the like. Generally, circular perforations are employed as these are convenient, easily located in the plate, and provide for substantially uniform flow through each perforation. The perforations can be laid out in any manner, e.g., on a triangular pitch or square pitch as desired. Understandably, the perforations should be well oriented in the perforated plate with respect to the cross-sectional area of the gas stream flowing through the plate so that the flow of gas approaching the plate will be substantially uniform.

Common materials of construction can be used for manufacturing the apparatus described herein, e.g., steel, iron, stainless steel and the like. Naturally, the corrosivity of the gas and entrained liquid is to be considered when selecting the materials of construction. Such materials and methods of construction are well known in the art.

What is claimed is:

1. In a gravitational liquid gas phase separator having a housing with a feed inlet, a gas outlet, and a liquid outlet located below the levels of the inlet and gas outlet, all communicating with the interior of the housing, means in the housing defining a gas flow chamber from the feed inlet to the gas outlet, and a mist eliminator pad disposed in the gas flow chamber, whereby when a gaseous stream containing entrained liquid droplets is passed from the feed inlet through said gas flow chamber and through the mist eliminator pad, the entrained liquid droplets are condensed from the gas stream and fall as droplets to the liquid outlet below and the dry gas passes to the gas outlet, the improvement which comprises:

as the sole flow restricting device in the gas flow region, a plate having a plurality of perforations of substantially uniform area and a size from about ⅛ to ¾ inch and distributed substantially uniformly across the plate, the perforations being present in a proportion to provide a combined cross-sectional area of about 0.3 to 30% of the total cross-sectional area of the plate, said plate having substantially the same configuration as the cross-sectional area of the mist eliminator pad, and disposed substantially transverse to the gas flow region between the mist eliminator pad and the gas outlet.

2. The phase separator of claim 1 wherein said plate is parallel to and spaced apart from said mist eliminator pad by a distance such that the ratio of the distance between the centers of adjacent perforations divided by the distance of said plate from said mist eliminator pad does not exceed the tangent of about 30°.

3. In a process for removing entrained liquid droplets from a gas stream by passing the gas stream through a mist eliminator pad in a liquid-gas phase separator for effecting condensation of the droplets, and permitting droplets to fall from the mist eliminator pad countercurrent to the gas stream to the liquid outlet, and discharging the dry gas to a gas outlet, the improvement for causing the gas stream to approach the mist eliminator pad at substantially uniform velocity across the surface of the pad which comprises:

effecting a pressure drop in the gas stream of from 55 to 75% of the total pressure drop of the gas stream in the phase separator through a surface aligned with the mist eliminator pad substantially transverse to the direction of flow of the gas stream, the surface having a plurality of perforations of from about ⅛ to ¾ inch in size and substantially uniformly distributed therein for effecting distribution of the gas stream across the surface, this pressure drop being effected at a point between the mist eliminator pad and gas outlet, and being the only substantial pressure drop exclusive of the mist eliminator pad.

* * * * *